United States Patent
Nishino et al.

(10) Patent No.: US 6,835,226 B2
(45) Date of Patent: Dec. 28, 2004

(54) NEGATIVE ELECTRODE ACTIVE MATERIAL, METHOD OF PRODUCING THE SAME, AND NONAQUEOUS ELECTROLYTE CELL

(75) Inventors: Takatomo Nishino, Tokyo (JP); Hiroaki Tanizaki, Miyagi (JP); Hiroshi Inoue, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/629,419

(22) Filed: Jul. 29, 2003

(65) Prior Publication Data

US 2004/0091775 A1 May 13, 2004

(30) Foreign Application Priority Data

Aug. 7, 2002 (JP) ..................................... P2002-230136

(51) Int. Cl.$^7$ .................................................. B22F 1/00
(52) U.S. Cl. ............................ 75/255; 75/338; 75/351; 429/231.1
(58) Field of Search ......................... 75/255, 338, 351; 429/231.1

(56) References Cited

U.S. PATENT DOCUMENTS

| | | | |
|---|---|---|---|
| 5,571,637 A | * | 11/1996 | Idota .......................... 429/338 |
| 6,555,272 B2 | * | 4/2003 | Suzuki et al. ............. 429/231.8 |
| 6,576,366 B1 | * | 6/2003 | Fujiwara et al. .......... 429/218.1 |
| 6,627,350 B2 | * | 9/2003 | Hashimoto et al. ...... 429/218.1 |

OTHER PUBLICATIONS

Gerasimov et al., On Mechanical of New Phases Formation During Mechanical Alloying of Ag–Cu, Al–Ge, and Fe–Sn Systems, Mat. Res. Bull. vol. 31, pp. 1297–1305, Oct. 1996.*

* cited by examiner

*Primary Examiner*—Ngoclan T. Mai
(74) *Attorney, Agent, or Firm*—Sonnenschein, Nath & Rosenthal LLP

(57) ABSTRACT

An alloy powder containing at least one element selected from the group consisting of the Group 14 elements exclusive of C and the Group 13 elements exclusive of Tl is subjected to a mechanical milling treatment, to obtain a negative electrode active material. Alternately, a raw material including a powder containing at least one element selected from the group consisting of the Group 14 elements exclusive of C and the Group 13 elements exclusive of Tl is subjected to a mechanical alloying treatment at a reaction temperature of below 90° C., to obtain a negative electrode active material. The negative electrode active material is restrained from the expansion and contraction attendant on the doping and dedoping of lithium which is characteristic of the alloy material, a negative electrode using the negative electrode active material is restrained from the change to a particulate form attendant on charging and discharging, and a nonaqueous electrolyte cell using the negative electrode shows both an excellent charging-discharging cycle characteristic and a high discharging capacity.

29 Claims, 2 Drawing Sheets

NEGATIVE ELECTRODE ACTIVE MATERIAL, METHOD OF PRODUCING THE SAME, AND NONAQUEOUS ELECTROLYTE CELL

RELATED APPLICATION DATA

The present application claims priority to Japanese Application(s) No(s). P2002-230136 filed Aug. 7, 2002, which application is incorporated herein by reference to the extent permitted by law.

BACKGROUND OF THE INVENTION

The present invention relates to a negative electrode active material containing at least one element selected from the group consisting of the Group 14 elements exclusive of C and the Group 13 elements exclusive of Tl, a method of producing the same, and a nonaqueous electrolyte cell using the negative electrode active material.

Attendant on the reduction in size of electronic apparatus, there has been a demand for development of a secondary cell having a high energy density. As a cell meeting the demand, there is a lithium secondary cell. However, in the lithium secondary cell, there is the problem that dendritic precipitation of lithium occurs on the negative electrode at the time of charging, to make the negative electrode inactive, resulting in a short cycle life.

As a means for improving the charging-discharging cycle characteristic of the lithium secondary cell, the so-called lithium ion secondary cell has been commercialized. For the negative electrode in the lithium ion secondary cell, there has been used a graphite material utilizing the intercalation reaction of lithium between graphite layers or a carbonaceous material applying the doping-dedoping actions of lithium into pores. Therefore, in the lithium ion secondary cell, the dendritic precipitation of lithium does not occur, and the cycle life is longer. In addition, since the graphite material and the carbonaceous material are stable in air, the lithium ion secondary cell has a great merit also from the viewpoint of industrial production.

However, the capacity of the negative electrode utilizing the intercalation has an upper limit determined by $C_6Li$, which is the composition of the first stage inter-graphite-layer compound. Besides, control of the fine porous structure of the carbonaceous material is difficult to achieve industrially and leads to a lowering in the specific gravity of the carbonaceous material, so that this approach cannot be an effective means of enhancing the negative electrode capacity per unit volume and, hence, the cell capacity per unit volume. It is known that a certain kind of carbonaceous material shows a negative electrode discharging capacity in excess of 1000 mAh/g. However, in the case where a cell including a metallic oxide or the like as the positive electrode is constituted for achieving a great capacity at a noble potential of not less than 0.8 V against lithium metal, there is the problem that the discharging voltage is lowered or the like problem.

For the above reasons, it is considered difficult for the negative electrode active material using the carbonaceous material in the present situation to cope with the prolongation of the period of time for which the electronic apparatus is to be used and the enhancement of energy density of the power source. Thus, there is a demand for a negative electrode active material which has a further higher doping-dedoping ability.

In view of the above-mentioned demand, materials capable of alloying with lithium, such as Zn, Cd, Pb, Sn, Bi, Si, In, Sb, Ge, etc. have been widely studied as negative electrode active material for attaining a high-capacity negative electrode. In addition, Li—Al alloys, Li—Si alloys as disclosed in U.S. Pat. No. 4,950,566, and the like have also been studied. Besides, negative electrode active materials using a compound of a Group 4B element other than carbon which contains at least one non-metallic element are disclosed in Japanese Patent Laid-open No. Hei 11-102705.

However, such materials as Zn, Cd, Pb, Sn, Bi, Si, In, Sb, Ge, etc., the Li—Al alloys, the Li—Si alloys and the like, and the compounds of a Group 4B element other than carbon which contains at least one non-metallic element all have the property of expanding and contracting attendant on the doping and dedoping of lithium, so that the cells using such a material as the negative electrode active material have the inconvenience that upon repeated charging and discharging the negative electrode becomes particulate, with the result of a conspicuous degradation of the charging-discharging cycle characteristics.

In order to improve the charging-discharging cycle characteristics, a method of adding to the negative electrode active material an element irrelevant to the expansion and contraction attendant on the doping and dedoping of lithium and the like methods have been investigated. For example, Japanese Patent Laid-open No. Hei 6-325765 discloses $Li_xSiO_y$ ($x \geq 0$; $2>y>0$), Japanese Patent Laid-open No. Hei 7-230800 discloses $Li_xSi_{1-y}M_yO_z$ ($x \geq 0$; $1>y>0$; $2>z>0$), and Japanese Patent Laid-open No. Hei 7-288130 discloses Li—Ag—Te alloys.

However, the improvements of the degradation of the charging-discharging cycle characteristic arising from the expansion and contraction of the alloy by these methods are still insufficient, and the characteristic features of the alloys have not yet been made most of.

SUMMARY OF THE INVENTION

The present invention has been made for solving the above-mentioned problems in the related art. Accordingly, it is an object of the present invention to provide a negative electrode active material capable of restraining the expansion and contraction attendant on the doping and dedoping of lithium which is characteristic of the alloy material, and a method of producing the same. In addition, it is another object of the present invention to provide a nonaqueous electrolyte cell which can restrain the change of the negative electrode into a particulate form attendant on the charging and discharging and can simultaneously show both high charging-discharging cycle characteristic and a high discharging capacity.

According to the first aspect of the present invention, there is provided a negative electrode active material prepared by subjecting to a mechanical milling treatment an alloy powder containing at least one element selected from the group consisting of the Group 14 elements exclusive of C and the Group 13 elements exclusive of Tl.

According to the second aspect of the present invention, there is provided a negative electrode active material prepared by subjecting a raw material including a powder containing at least one element selected from the group consisting of the Group 14 elements exclusive of C and the Group 13 elements exclusive of Tl to a mechanical alloying treatment at a reaction temperature of below 90° C.

According to the third aspect of the present invention, there is provided a method of producing a negative electrode active material which includes subjecting to a mechanical milling treatment an alloy powder containing at least one element selected from the group consisting of the Group 14 elements exclusive of C and the Group 13 elements exclusive of Tl.

According to the fourth aspect of the present invention, there is provided a method of producing a negative electrode active material which includes subjecting a raw material including a powder containing at least one element selected from the group consisting of the Group 14 elements exclusive of C and the Group 13 elements exclusive of Tl to a mechanical alloying treatment at a reaction temperature of below 90° C.

According to the fifth aspect of the present invention, there is provided a nonaqueous electrolyte cell including a negative electrode including a negative electrode active material, a positive electrode, and a nonaqueous electrolyte, wherein the negative electrode active material is prepared by subjecting to a mechanical milling treatment an alloy powder containing at least one element selected-from the group consisting of the Group 14 elements exclusive of C and the Group 13 elements exclusive of Tl.

According to the sixth aspect of the present invention, there is provided a nonaqueous electrolyte cell including a negative electrode including a negative electrode active material, a positive electrode, and a nonaqueous electrolyte, wherein the negative electrode active material is prepared by subjecting a raw material including a powder containing at least one element selected from the group consisting of the Group 14 elements exclusive of C and the Group 13 elements exclusive of Tl to a mechanical alloying treatment at a reaction temperature of below 90° C.

According to the present invention, the alloy powder is changed in shape by the mechanical milling treatment, whereby a negative electrode active material restrained from the expansion and contraction attendant on the doping and dedoping of lithium can be obtained.

According to the present invention, the reaction temperature is controlled to be below 90° C. in subjecting the powder as the raw material to the mechanical alloying treatment, the expansion and contraction attendant on the doping and dedoping of lithium can be restrained.

In a method of producing a negative electrode active material according to the present invention, the alloy powder is changed in shape by the mechanical milling treatment, whereby a negative electrode active material restrained from the expansion and contraction attendant on the doping and dedoping of lithium can be obtained. Further, by using this negative electrode active material, a nonaqueous electrolyte cell having a greatly enhanced charging-discharging cycle characteristic and a high discharging capacity can be realized.

In a method of producing a negative electrode active material according to the present invention, the reaction temperature is controlled to be below 90° C. in subjecting the powder as the raw material to the mechanical alloying treatment, the expansion and contraction attendant on the doping and dedoping of lithium can be restrained. Further, by using this negative electrode active material, a nonaqueous electrolyte cell having a greatly enhanced charging-discharging cycle characteristic and a high discharging capacity can be realized.

The above and other objects, features and advantages of the present invention will become-apparent from the following description and appended claims, taken in conjunction with the accompanying drawings which show by way of example some preferred embodiments of the invention.

DETAILED DESCRIPTION OF THE PREFERRED EMBODIMENTS

Figure 1:
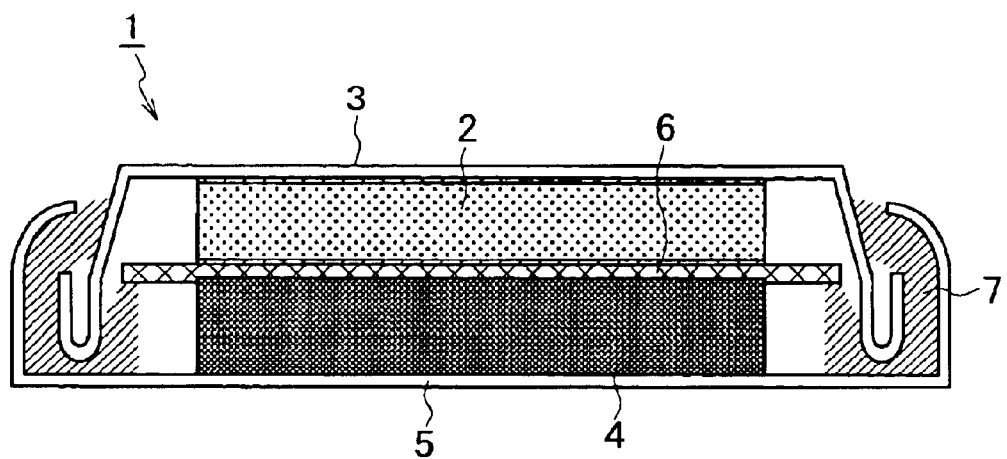
FIG. 1 is a general sectional view showing an example of a nonaqueous electrolyte cell using a negative electrode active material prepared according to the present invention.

Now, the negative electrode active material, the method of producing the same, and the nonaqueous electrolyte cell according to the present invention will be described in detail below.

The negative electrode active material according to the present invention is a negative electrode active material for use in a nonaqueous electrolyte cell such as, for example, a nonaqueous liquid electrolyte secondary cell, and is an alloy containing at least one element selected from the group consisting of the Group 14 elements exclusive of C and the Group 13 elements exclusive of Tl. Here, the group consisting of the Group 14 elements exclusive of C and the Group 13 elements exclusive of Tl is constituted of Si, Ge, Sn, Pb, B, Al, Ga, and In. In addition to the at least one element, the negative electrode active material according to the present invention may contain an element or elements selected from the group consisting of the transition elements belonging to the fourth period. The group consisting of the transition elements belonging to the fourth period is constituted of Sc, Ti, V, Cr, Mn, Fe, Co, Ni, Cu, and Zn.

Such a negative electrode active material as above is prepared by a method in which the alloy powder containing the above-mentioned element or elements is subjected to a mechanical milling or a method in which the raw material containing the above-mentioned element or elements is subjected to a mechanical alloying treatment while controlling the reaction temperature during the mechanical alloying treatment, whereby it is ensured that the negative electrode active material obtained is restrained from the expansion and contraction attendant on the doping and dedoping of lithium, namely, the problem which would otherwise occur with the alloy material.

The mechanical milling treatment herein means a method in which an alloy powder having a desired composition is preliminarily prepared and the alloy powder is mechanically agitated, and the agitation here may be any agitation that will produce a change in the shape of the alloy powder. The mechanical alloying treatment herein means a method in which a several kinds of powders as raw materials are mechanically agitated, and cold press bonding and breakage of the powder particles are repeated to effect alloying, thereby preparing the alloy powder having the desired composition.

The method of producing the negative electrode active material by subjecting the alloy powder containing the above-mentioned specified element or elements to the mechanical milling treatment will be described.

First, the raw material prepared by mixing specified amounts of the powder containing at least one element selected from the group consisting of the Group 14 elements exclusive of C and the Group 13 elements exclusive of Tl, the powder containing at least one element selected from the transition elements belonging to the fourth period, and/or the like is melted by heating, and the raw material in the molten state is solidified, to produce the alloy powder. Specific examples of this method include various atomizing methods such as a gas atomizing method, a water atomizing method, etc., various roll methods such as a twin-roll method, etc., and a spraying method. Further, the alloy can be obtained also by a mechanical alloying method using diffusion of solid matters, or a vacuum film forming method. Non-limitative examples of means usable for melting the raw material include an electric furnace, a high-frequency induction furnace, and an arc melting furnace.

Next, the alloy powder thus obtained is subjected to the mechanical milling treatment, to complete the production of the negative electrode active material. The mechanical milling treatment may be carried out by use of a ball mill such as a planetary ball mill, etc., an agitation type mill such as an attritor fitted with an agitator, etc., or the like means.

Since the negative electrode active material thus obtained has undergone the mechanical milling treatment of the alloy powder containing the specified element or elements, namely, at least one element selected from the group consisting of the Group 14 elements exclusive of C and the Group 13 elements exclusive of Tl, the particles of the negative electrode active material have undergone a change in shape, such as flattening, and the specific surface area thereof has been enlarged, for example, to not less than two times of the initial value. As a result, the negative electrode active material obtained is restrained from the expansion and contraction attendant on the doping and dedoping of lithium. Therefore, the negative electrode using the negative electrode active material thus produced according to the present invention is restrained from the change to a particulate form upon repeated charging and discharging, while realizing a high negative electrode capacity, which is a characteristic feature of the alloy. Accordingly, a nonaqueous electrolyte cell using the negative electrode active material can realize a high discharging capacity and can show a greatly enhanced charging-discharging cycle characteristic.

Another method of producing the negative electrode active material according to the present invention, i.e., the method in which the raw material containing the above-mentioned specified element or elements is subjected to the mechanical alloying treatment to effect alloying while controlling the reaction temperature during the mechanical alloying treatment, to thereby produce the negative electrode active material, will be described.

In this method, specific amounts of the powder containing at least one element selected from the group consisting of the Group 14 elements exclusive of C and the Group 13 elements exclusive of Tl and, if necessary, the powder containing at least one element selected from the transition elements belonging to the fourth period are weighed as raw material(s).

The raw material(s) thus weighed are put into a reaction vessel, and the mechanical alloying treatment is conducted to effect alloying, to thereby prepare the negative electrode active material having the desired alloy composition. In the present invention, the reaction is so controlled that the temperature inside the reaction vessel during the mechanical alloying treatment is maintained to be below 90° C., preferably below 85° C. The mechanical alloying treatment may be carried out by use of a ball mill such as a planetary ball mill, etc., an agitation type mill such as an attritor fitted with an agitator, etc., or the like means.

The negative electrode active material thus obtained is restrained from the expansion and contraction attendant on the doping and dedoping of lithium, because the temperature inside the reaction vessel has been maintained at a lower temperature, as compared with that in the related art, in conducting the mechanical alloying treatment of the alloy powder containing the specified element or elements, namely, at least one element selected from the group consisting of the Group 14 elements exclusive of C and the Group 13 elements exclusive of Tl. As a result, the negative electrode using the negative electrode active material prepared according to the present invention can be restrained from the change to a particulate form upon repeated charging and discharging, while realizing a high negative electrode capacity, which is a characteristic feature of the alloy. Accordingly, a nonaqueous electrolyte cell using the negative electrode active material can realize a high discharging capacity and can show a greatly enhanced charging-discharging cycle characteristic.

In contrast to this, where the control of the temperature inside the reaction vessel is not conducted, the reaction conditions would be obscure because the amount of heat generated differs according to the kinds of the materials being alloyed, resulting in a lowering in the quality of the negative electrode active material prepared. Besides, where the temperature inside the reaction vessel is higher than the above-mentioned temperature range, the negative electrode active material obtained will show an insufficient effect of restraining the expansion and contraction attendant on the doping and dedoping of lithium.

Furthermore, in order to more securely restrain the expansion and contraction of the negative electrode active material attendant on the doping and dedoping of lithium, it is preferable to conduct the mechanical alloying treatment so that the negative electrode active material has an oxygen concentration of not more than 1% by weight.

Now, a nonaqueous electrolyte cell using the negative electrode active material produced according to the present invention will be described below, referring to FIG. 1.

The nonaqueous liquid electrolyte cell 1 includes a negative electrode 2, a negative electrode can 3 for containing the negative electrode 2, a positive electrode 4, a positive electrode can 5 for containing the positive electrode 4, a separator 6 disposed between the positive electrode 4 and the negative electrode 2, and an insulating gasket 7, with a nonaqueous liquid electrolyte contained in the negative electrode can 3 and the positive electrode can 5.

The negative electrode 2 includes a negative electrode material layer containing a negative electrode active material and formed on a negative electrode current collector. As the negative electrode current collector, for example, a nickel foil or the like is used. As the negative electrode active material, the alloy negative electrode active material produced by the method as above-described is used.

The negative electrode can 3 is for containing the negative electrode 2, and serves as an external negative electrode of the nonaqueous liquid electrolyte cell 1.

The positive electrode 4 includes a positive electrode active material layer containing a positive electrode active material and formed on a positive electrode current collector. As the positive electrode current collector, for example, an aluminum foil is used.

The positive electrode 4 preferably contains a sufficient amount of lithium, and, for example, a lithium-containing compound metallic oxide represented by the general formula $Li_xMO_2$ or $Li_xM_2O_4$ (where M is at least one element selected from Co, Ni, and Mn; and 0<x<1) or a lithium compound such as a lithium-containing interlayer compound is used as the positive electrode active material.

The lithium-containing compound metallic oxide can be prepared by grinding and mixing carbonate, nitrate, oxide, or hydroxide of lithium and carbonate, nitrate, oxide, or hydroxide of cobalt, manganese, nickel or the like according to the desired composition, and baking the mixture in an oxygen atmosphere in a temperature range of from 600 to 1000° C.

As a binder to be contained in the positive electrode active material layer, a known resin material or the like which is conventionally used as a binder for the positive electrode active material in the nonaqueous liquid electrolyte cell of this kind may be used.

The positive electrode can 5 is for containing the positive electrode 4, and serves as an external positive electrode of the nonaqueous liquid electrolyte cell 1.

The separator 6 is for separating the positive electrode 4 and the negative electrode 2 from each other. For the separator 6, a known material conventionally used for the separator in the nonaqueous liquid electrolyte cell of this kind may be used; for example, a film of a polymer such as polypropylene may be used. Besides, in view of the relationship between lithium ion conductivity and energy density, it is necessary that the thickness of the separator 6 is as small as possible. To be more specific, the thickness of the separator 6 is preferably not more than 50 μm, for example.

The insulating gasket 7 is mounted on and integrated with the negative electrode can 3. The insulating gasket 7 is for preventing leakage of the nonaqueous liquid electrolyte contained in the negative electrode can 3 and the positive electrode can 5.

As the nonaqueous liquid electrolyte, a solution prepared by dissolving an electrolyte in an aprotic nonaqueous solvent is used.

Examples of the nonaqueous solvent usable here include propylene carbonate, ethylene carbonate, diethyl carbonate, methyl ethyl carbonate, 1,2-dimethoxyethane, 1,2-diethoxyethane, γ-butyrolactone, tetrahydrofuran, 2-methyltetrahydrofuran, 1,3-dioxolan, 4-methyl-1,3-dioxolan, diethyl ether, sulfolane, methylsulfolane, acetonitrile, propylnitrile, anisole, acetic acid esters, and propionic acid esters, which may be used either singly or in combination of two or more thereof.

Examples of the electrolyte to be dissolved in the nonaqueous solvent here include lithium salts such as $LiClO_4$, $LiAsF_6$, $LiPF_6$, $LiBF_4$, $LiB(C_6H_5)_4$, $LiCH_3SO_3$, $LiCF_3SO_3$, LiCl, and LiBr.

The nonaqueous liquid electrolyte cell 1 using the negative electrode active material obtained as above-described is produced, for example, as follows.

To produce the negative electrode 2, the negative electrode active material obtained as above-described and the binder are dispersed in a solvent, to prepare a slurry form negative electrode composition. The negative electrode composition thus obtained is applied uniformly to the negative electrode current collector, and is dried to form the negative electrode active material layer, thereby producing the negative electrode 2. As the binder for the negative electrode composition, a known binder can be used; besides, known additives and the like can be added to the negative electrode composition.

To produce the positive electrode 4, the positive electrode active material and the binder are dispersed in a solvent, to prepare a slurry form positive electrode composition. The positive electrode composition thus obtained is applied uniformly to the positive electrode current collector, and is dried to form the positive electrode active material layer, thereby producing the positive electrode 4. As the binder for the positive electrode composition, a known binder can be used; besides, known additives and the like can be added to the positive electrode composition.

The nonaqueous liquid electrolyte is prepared by dissolving the electrolyte salt in the nonaqueous solvent.

The negative electrode 2 is contained in the negative electrode can 3, the positive electrode 4 is contained in the positive electrode can 5, and the separator 6 comprised of a porous polypropylene film or the like is disposed between the negative electrode 2 and the positive electrode 4. The nonaqueous liquid electrolyte is poured into the inside of the negative electrode can 3 and the positive electrode can 5, and the negative electrode can 3 and the positive electrode can 5 are fixed by caulking them onto each other, with the insulating gasket 7 therebetween, to complete the nonaqueous liquid electrolyte cell 1.

The nonaqueous liquid electrolyte cell 1 produced as above uses the negative electrode active material obtained by subjecting the alloy powder to the mechanical milling treatment or by subjecting the alloy powder to the mechanical alloying treatment while controlling the reaction temperature to be below 90° C., so that the change of the negative electrode into a particulate form is restrained, and an excellent charging-discharging cycle characteristic can be realized. In addition, since the nonaqueous liquid electrolyte cell 1 uses the negative electrode active material which shows a high negative electrode capacity, a high discharging capacity can be realized.

Incidentally, while the nonaqueous liquid electrolyte cell 1 using the nonaqueous liquid electrolyte as the nonaqueous electrolyte has been taken as an example in the description of the embodiment above, the present invention is not limited to this; namely, the present invention is applicable also to a solid electrolyte cell using a polymeric solid electrolyte containing a conductive polymeric compound or a mixture of conductive polymeric compounds, and to a gelled electrolyte cell using a gelled electrolyte containing a swelling solvent.

Specific examples of the conductive polymeric compound which can be contained in the polymeric solid electrolyte or the gelled electrolyte here include silicones, acryl polymers, acrylonitrile, polyphosphazene-modified polymers, polyethylene oxide, polypropylene oxide, fluoro polymers, and composite polymers, crosslinked polymers, modified polymers and the like of these compounds. Examples of the fluoro polymers include poly(vinylidene fluoride), poly(vinylidene fluoride-co-hexafluoropropylene), poly(vinylidene fluoride-co-tetrafluoroethylene), and poly(vinylidene fluoride-co-trifluoroethylene).

In addition, while a coin-shaped cell has been taken as an example in the description of the embodiment above, the cell according to the present invention is not particularly limited in shape, and the shape of the cell may be cylindrical, angular (polygonal), button-like or the like; besides, the cell may take various dimensions, such as a thin type, a large type, etc.

Furthermore, the present invention is not limited to the above description, and appropriate modifications are possible without departing from the gist of the invention.

EXAMPLES

Now, specific examples of carrying out the present invention will be described below, based on experimental results.

<Experiment 1>

In Experiment 1, negative electrode active materials were prepared by mechanical milling, and the charging-discharging cycle characteristics of nonaqueous electrolyte cells using the negative electrode active materials thus prepared were evaluated.

Example 1

First, a negative electrode active material was prepared as follows. Predetermined amounts of Cu and Sn were placed in a high-frequency melting furnace, were melted, and the melt was sprayed in an Ar atmosphere, to obtain a powdery material having a composition of 55% by weight of Cu and 45% by weight of Sn.

Figure 2:
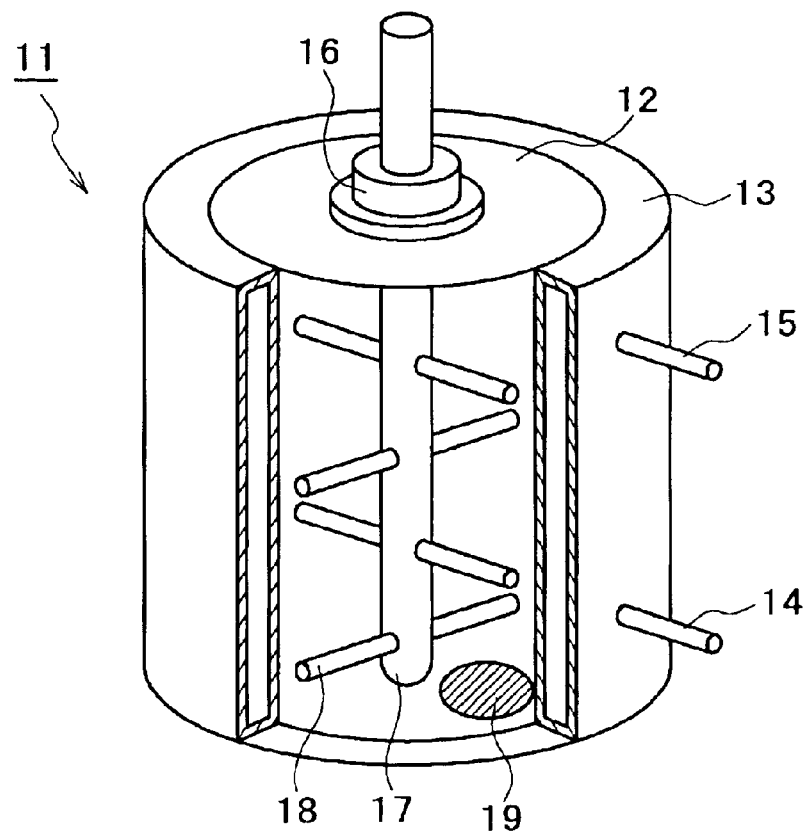
FIG. 2 is a perspective sectional view showing, by cutting out in part, an attritor for use in preparation of the negative electrode active material.

Next, the powdery material was subjected to a mechanical milling treatment using a dry-type attritor MA1D, a product by Mitsui Mining Co., Ltd. As shown in FIG. 2, the attritor 11 used includes a crushing tank 12, a jacket 13 mounted around the crushing tank 12, a cooling water inlet 14 for supplying cooling water into the jacket 13, a cooling water outlet 15 for discharging cooling water, a gas seal 16 for sealing a flushing gas, an arm shaft 17 for transmitting rotation from an external drive system, agitator arms 18 attached to the arm shaft 17, and a discharge screen 20 for taking out the prepared powder to the exterior.

To carry out the mechanical milling treatment, 1 kg of the powdery material was charged into the crushing tank 12 in an Ar atmosphere, and 18.0 kg of hard Cr steel balls about 9 mm in diameter as milling media 19 were similarly charged into the crushing tank 12 in an Ar atmosphere. Then, the rotational speed of the agitator arms 18 was set to 200 rpm, and the mechanical milling treatment was carried out for 1 hr.

After the reaction was over, the powder was taken out of the crushing tank 12, and was sifted by use of a 200-mesh sieve, to obtain a negative electrode active material.

Figure 3:
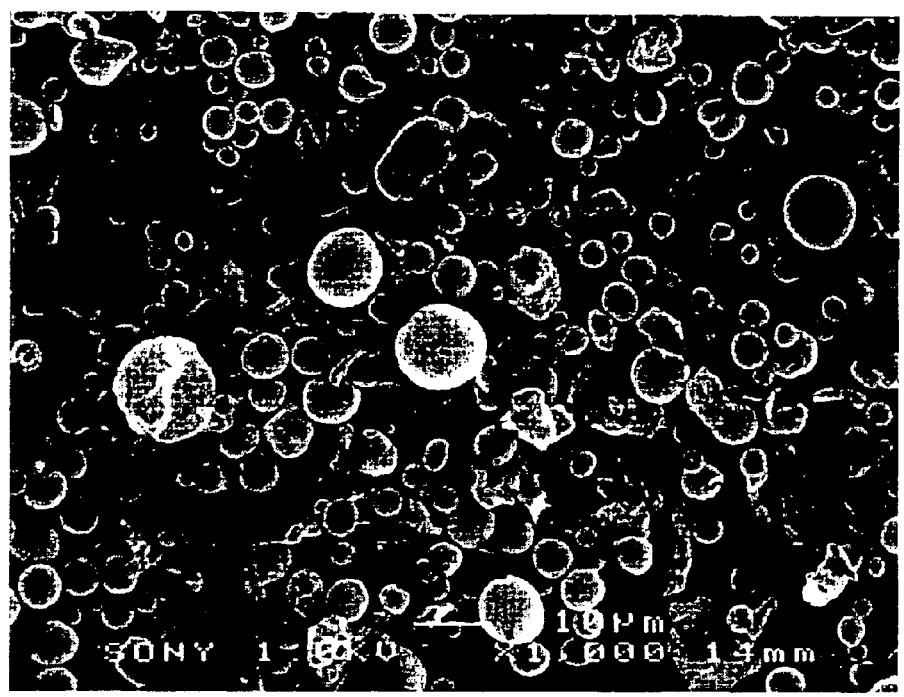
FIG. 3 is an electron microphotograph of the negative electrode active material before mechanical milling.
Figure 4:
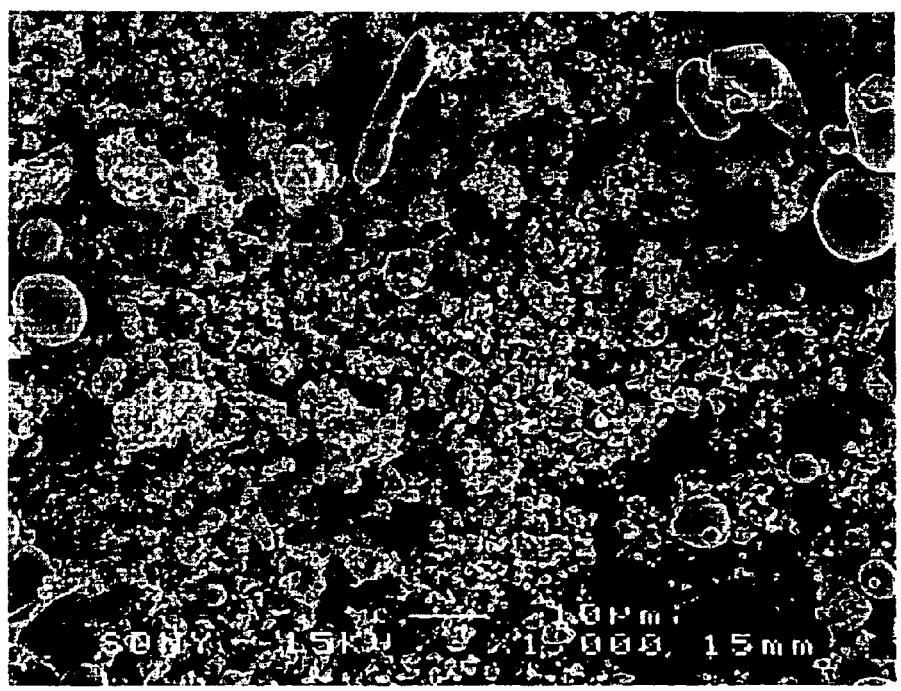
FIG. 4 is an electron microphotograph of the negative electrode active material after mechanical milling.

Here, an electron microphotograph of the powder before the mechanical milling and that of the negative electrode active material after the mechanical milling are shown in FIGS. 3 and 4, respectively. As is clear from FIGS. 3 and 4, the powder particles which had been spherical before the mechanical milling treatment were flattened in shape by the treatment.

In addition, the powder before the mechanical milling and the negative electrode active material after the mechanical milling were subjected to measurement of specific surface area by the BET one-point system using helium as a carrier gas and nitrogen as an adsorbent. The specific surface area of the negative electrode active material after the mechanical milling was found to be 4.6 times that of the powder before the mechanical milling.

Next, by use of the negative electrode active material thus obtained, a coin-shaped cell for evaluation was assembled. A negative electrode composition was prepared by mixing materials so that the composition contains 50% by weight of the negative electrode active material prepared above, 45% by weight of artificial graphite as a conductivity assistant, and 5% by weight of poly(vinylidene fluoride) as a binder, and the composition was dispersed in N-methyl-2-pyrrolidone, to obtain a slurry. The slurry was applied uniformly to a copper foil 15 μm in thickness, was dried, then the laminate obtained was blanked in a circular shape about 15 mm in diameter, and the circular laminate was compressed on a press, to obtain a test electrode.

On the other hand, metallic lithium about 16 mm in diameter was prepared as a counter electrode. A porous polypropylene film was prepared as a separator. A solution containing 1 mol/l of lithium hexafluorophosphate in an equimolar mixed solvent of ethylene carbonate and ethyl methyl carbonate was prepared as a liquid electrolyte.

Then, the counter electrode was contained in a negative electrode can, the test electrode was contained in a positive electrode can, and the separator was disposed between the counter electrode and the test electrode. Next, the liquid electrolyte was poured into the inside of the negative electrode can and the positive electrode can, and the negative electrode can and the positive electrode can were fixed by caulking onto each other, with an insulating gasket therebetween, to obtain a coin-shaped cell for evaluation which was about 20 mm in diameter and about 1.6 mm in thickness.

Example 2

A coin-shaped cell for evaluation was obtained in the same manner as in Example 1, except that a negative electrode active material produced by the mechanical milling treatment of an alloy powder containing 23% by weight of Fe and 77% by weight of Sn was used.

Example 3

A coin-shaped cell for evaluation was obtained in the same manner as in Example 1, except that a negative electrode active material produced by the mechanical milling treatment of an alloy powder containing 31% by weight of Co and 69% by weight of Sn was used.

Example 4

A coin-shaped cell for evaluation was obtained in the same manner as in Example 1, except that a negative electrode active material produced by the mechanical milling treatment of an alloy powder containing 60% by weight of Cu, 20% by weight of In, and 20% by weight of Sn was used.

Example 5

A coin-shaped cell for evaluation was obtained in the same manner as in Example 1, except that a negative electrode active material produced by the mechanical milling treatment of an alloy powder containing 23% by weight of Co, 72% by weight of Sn, and 5% by weight of Al was used.

Comparative Example 1

A coin-shaped cell for evaluation was obtained in the same manner as in Example 1, except that the alloy powder was used as it was as the negative electrode active material, without subjecting it to the mechanical milling treatment.

Comparative Example 2

A coin-shaped cell for evaluation was obtained in the same manner as in Example 2, except that the alloy powder was used as it was as the negative electrode active material, without subjecting it to the mechanical milling treatment.

Comparative Example 3

A coin-shaped cell for evaluation was obtained in the same manner as in Example 3, except that the alloy powder was used as it was as the negative electrode active material, without subjecting it to the mechanical milling treatment.

Comparative Example 4

A coin-shaped cell for evaluation was obtained in the same manner as in Example 4, except that the alloy powder was used as it was as the negative electrode active material, without subjecting it to the mechanical milling treatment.

Comparative Example 5

A coin-shaped cell for evaluation was obtained in the same manner as in Example 5, except that the alloy powder was used as it was as the negative electrode active material, without subjecting it to the mechanical milling treatment.

For each of the cells for evaluation obtained as described above, charging-discharging cycle characteristic was evaluated by conducting a charging-discharging test as follows.

First, the cell for evaluation was charged at a constant current of 1 mA, and when the cell voltage reached 10 mV, the charging mode was changed over to charging at a constant voltage of 10 mV. The charging at the constant voltage was finished at the time when the charging current reached 20 $\mu$A. Next, discharging at a constant current of 1 mA was conducted until the cell voltage reached 1.2 V. The charging-discharging cycle characteristic was evaluated in terms of the ratio of the discharging capacity at the tenth cycle to the discharging capacity at the first cycle (capacity retention factor). The results are shown in Table 1 below.

First, 1 kg of the raw material powder was accurately weighed so as to contain 55% by weight of the Cu powder and 45% by weight of the Sn powder, and was put into the crushing tank 12 of the attritor 11 used in Example 1. As the milling media 19, 18.0 kg of hard Cr steel balls about 9 mm in diameter were used.

Then, the powder was subjected to a mechanical alloying treatment. The inside of the crushing tank 12 was flushed with Ar atmosphere, and the rotational speed of the agitator arms 18 was set to 200 rpm. In operation, 10-min operation and 10-min rest were repeated alternately until the total operation time reached 8 hr. During the operation, the reaction temperature was controlled by controlling the temperature of the jacket 13, while checking for that the temperature inside the crushing tank 12 did not exceed 90° C., more specifically, that the maximum temperature reached was 84° C.

After the reaction was over, the crushing tank 12 was cooled, for example, to room temperature, then the powder was taken out, and was sifted by a 200-mesh sieve to remove coarse particles, thereby obtaining the negative electrode active material.

The oxygen concentration in the negative electrode active material was measured on an oxygen-nitrogen analyzer (commercial name: EMGA-650, a product by Horiba Seisakusho K.K.) as follows. First, 30 mg of the negative electrode active material prepared above as a sample was accurately weighed, the powder was then put into a 0.3 g Ni pellet for exclusive use on the analyzer, and the capsule was

TABLE 1

| | FIRST ELEMENT | AMOUNT (wt. %) | SECOND ELEMENT | AMOUNT (wt. %) | THIRD ELEMENT | AMOUNT (wt. %) | MILLING TREATMENT | CAPACITY RETENTION FACTOR |
|---|---|---|---|---|---|---|---|---|
| Ex. 1 | Cu | 55 | Sn | 45 | — | — | DONE | 82 |
| Ex. 2 | Fe | 23 | Sn | 77 | — | — | DONE | 83 |
| Ex. 3 | Co | 31 | Sn | 69 | — | — | DONE | 82 |
| Ex. 4 | Cu | 60 | In | 20 | Si | 20 | DONE | 80 |
| Ex. 5 | Co | 23 | Sn | 72 | Al | 5 | DONE | 85 |
| Comp. Ex. 1 | Cu | 55 | Sn | 45 | — | — | UNDONE | 64 |
| Comp. Ex. 2 | Fe | 23 | Sn | 77 | — | — | UNDONE | 48 |
| Comp. Ex. 3 | Co | 31 | Sn | 69 | — | — | UNDONE | 51 |
| Comp. Ex. 4 | Cu | 60 | In | 20 | Si | 20 | UNDONE | 60 |
| Comp. Ex. 5 | Co | 23 | Sn | 72 | Al | 5 | UNDONE | 70 |

As is clear from Table 1, Examples 1 to 5 gave higher capacity retention factors as compared with those given by Comparative Examples 1 to 5. This shows that a negative electrode active material showing an excellent charging-discharging cycle characteristic when used for a negative electrode in a nonaqueous electrolyte cell can be produced by subjecting an alloy powder to a mechanical milling treatment.

<Experiment 2>

In Experiment 2, negative electrode active materials were prepared by a mechanical alloying treatment, and the charging-discharging cycle characteristics of nonaqueous electrolyte cells using the negative electrode active materials thus prepared were evaluated.

Example 6

First, a negative electrode active material was produced as follows. Predetermined amounts of Cu and Sn were put into a high-frequency melting furnace, were melted, and the melt was sprayed in an Ar atmosphere, to obtain a powdery material having a composition of 55% by weight of Cu and 45% by weight of Sn.

sealed off by a pair of normal long-nose pliers. Melting of the sample was conducted by use of a graphite crucible for exclusive use on the analyzer. Incidentally, about 0.5 g of Sn pellets were placed in the graphite crucible at the time of melting, for promoting gas generation. Both the graphite crucible and the Sn pellets had been preliminarily degassed before analysis of the sample. The measurement atmosphere contained not less than 99.99% of He gas. In measurement, the graphite crucible was heated to around 300° C. to thereby convert oxygen in the material to carbon monoxide, which was detected by a high-sensitivity dispersion infrared detector, to measure the oxygen concentration in the material. Incidentally, the analyzer was calibrated by use of a material having a known oxygen concentration, prior to the measurement, and the actual measurement for the sample was conducted in the calibrated condition.

Next, a coin-shaped cell for evaluation about 20 mm in diameter and about 1.6 mm in thickness was assembled by use of the negative electrode active material obtained above, in the same manner as in Example 1 of Experiment 1.

Example 7

A coin-shaped cell for evaluation was obtained in the same manner as in Example 6, except that a negative electrode active material produced by the mechanical alloying treatment of 1 kg of a raw material powder containing 23% by weight of Fe powder and 77% by weight of Sn powder was used. Incidentally, the maximum temperature reached in the crushing tank 12 was 77° C.

Example 8

A coin-shaped cell for evaluation was obtained in the same manner as in Example 6, except that a negative electrode active material produced by the mechanical alloying treatment of 1 kg of a raw material powder containing 31% by weight of Co powder and 69% by weight of Sn powder was used. Incidentally, the maximum temperature reached in the crushing tank 12 was 81° C.

Example 9

A coin-shaped cell for evaluation was obtained in the same manner as in Example 6, except that a negative electrode active material produced by the mechanical alloying treatment of 1 kg of a raw material powder containing 60% by weight of Cu powder, 20% by weight of In powder, and 20% by weight of Si powder was used. Incidentally, the maximum temperature reached in the crushing tank 12 was 82° C.

Example 10

A coin-shaped cell for evaluation was obtained in the same manner as in Example 6, except that a negative electrode active material produced by the mechanical alloying treatment of 1 kg of a raw material powder containing 23% by weight of Co powder, 72% by weight of Sn powder, and 5% by weight of Al powder was used. Incidentally, the maximum temperature reached in the crushing tank 12 was 80° C.

Comparative Example 6

A coin-shaped cell for evaluation was obtained in the same manner as in Example 6, except that a negative electrode active material prepared by a continuous operation without rest time during the mechanical alloying treatment was used. Incidentally, the maximum temperature reached in the crushing tank 12 was 98° C.

Comparative Example 7

A coin-shaped cell for evaluation was obtained in the same manner as in Example 7, except that a negative electrode active material prepared by a continuous operation without rest time during the mechanical alloying treatment was used. Incidentally, the maximum temperature reached in the crushing tank 12 was 105° C.

Comparative Example 8

A coin-shaped cell for evaluation was obtained in the same manner as in Example 8, except that a negative electrode active material prepared by a continuous operation without rest time during the mechanical alloying treatment was used. Incidentally, the maximum temperature reached in the crushing tank 12 was 102° C.

Comparative Example 9

A coin-shaped cell for evaluation was obtained in the same manner as in Example 9, except that a negative electrode active material prepared by a continuous operation without rest time during the mechanical alloying treatment was used. Incidentally, the maximum temperature reached in the crushing tank 12 was 114° C.

Comparative Example 10

A coin-shaped cell for evaluation was obtained in the same manner as in Example 10, except that a negative electrode active material prepared by a continuous operation without rest time during the mechanical alloying treatment was used. Incidentally, the maximum temperature reached in the crushing tank 12 was 106° C.

For each of the cells for evaluation produced as described above, charging-discharging cycle characteristic was evaluated by conducting a charging-discharging test in the same manner as in Experiment 1. The results are shown in Table 2 below, together with the measurement results of the oxygen concentration in the negative electrode active material.

TABLE 2

| | FIRST ELEMENT | AMOUNT (wt. %) | SECOND ELEMENT | AMOUNT (wt. %) | THIRD ELEMENT | AMOUNT (wt. %) | MAX. TEMP. (° C.) | CAPACITY RETENTION FACTOR | OXYGEN CONCENTRATION (wt. %) |
|---|---|---|---|---|---|---|---|---|---|
| Ex. 6 | Cu | 55 | Sn | 45 | — | — | 84 | 82 | 0.839 |
| Ex. 7 | Fe | 23 | Sn | 77 | — | — | 77 | 80 | 0.955 |
| Ex. 8 | Co | 31 | Sn | 69 | — | — | 81 | 86 | 0.458 |
| Ex. 9 | Cu | 60 | In | 20 | Si | 20 | 82 | 83 | 0.910 |
| Ex. 10 | Co | 23 | Sn | 72 | Al | 5 | 80 | 90 | 0.302 |
| Comp. Ex. 6 | Cu | 55 | Sn | 45 | — | — | 98 | 64 | 2.776 |
| Comp. Ex. 7 | Fe | 23 | Sn | 77 | — | — | 105 | 59 | 4.233 |
| Comp. Ex. 8. | Co | 31 | Sn | 69 | — | — | 102 | 72 | 1.464 |
| Comp. Ex. 9 | Cu | 60 | In | 20 | Si | 20 | 114 | 60 | 3.176 |
| Comp. Ex. 10 | Co | 23 | Sn | 72 | Al | 5 | 106 | 80 | 1.311 |

As is clear from Table 2, Examples 6 to 10 gave higher capacity retention factors as compared with those given by Comparative Examples 6 to 10. This means that a negative electrode active material showing an excellent charging-discharging cycle characteristic when used for a negative electrode in a nonaqueous electrolyte cell can be prepared by controlling the reaction temperature during the mechanical alloying treatment to be below 90° C., preferably below 85° C.

Besides, it is seen that in Examples 6 to 10, the oxygen concentration in the negative electrode active material is not more than 1% by weight. This shows that the effect of enhancing the charging-discharging cycle characteristic can be obtained more securely when the oxygen concentration in the negative electrode active material is specified as above-mentioned.

While preferred embodiments of the present invention have been described using specific terms, such description is for illustrative purposes only, and it is to be understood that changes and variations may be made without departing from the spirit or scope of the following claims.

What is claimed is:

1. A negative electrode active material prepared by subjecting to a mechanical milling treatment an alloy powder containing at least one element selected from the group consisting of the Group 14 elements exclusive of C and the Group 13 elements exclusive of Tl.

2. A negative electrode active material as set forth in claim 1, wherein said alloy powder further comprises at least one element selected from the transition elements belonging to the fourth period.

3. A negative electrode active material as set forth in claim 1, wherein said alloy powder is prepared by melting liquefying at least one element selected from the group consisting of the Group 14 elements exclusive of C and the Group 13 elements exclusive of Tl by heating.

4. A negative electrode active material as set forth in claim 3, wherein said alloy powder is prepared by a gas atomizing method.

5. A negative electrode active material prepared by subjecting a raw material comprising a powder containing at least one element selected from the group consisting of the Group 14 elements exclusive of C and the Group 13 elements exclusive of Tl to a mechanical alloying treatment at a reaction temperature of below 90° C.

6. A negative electrode active material as set forth in claim 5, wherein said raw material further comprises a powder containing at least one element selected from the transition elements belonging to the fourth period.

7. A negative electrode active material as set forth in claim 5, wherein oxygen concentration is not more than 1% by weight.

8. A negative electrode active material as set forth in claim 5, wherein the reaction temperature during said mechanical alloying treatment is below 85° C.

9. A method of producing a negative electrode active material which comprises subjecting to a mechanical milling treatment an alloy powder containing at least one element selected from the group consisting of the Group 14 elements exclusive of C and the Group 13 elements exclusive of Tl.

10. A method of producing a negative electrode active material as set forth in claim 9, wherein said alloy powder further comprises at least one element selected from the transition elements belonging to the fourth period.

11. A method of producing a negative electrode active material as set forth in claim 9, wherein said mechanical milling treatment is carried out by use of a ball mill.

12. A method of producing a negative electrode active material as set forth in claim 9, wherein said mechanical milling treatment is carried out by use of an attritor.

13. A method of producing a negative electrode active material as set forth in claim 9, wherein said alloy powder is prepared by melting and liquefying at least one element selected from the group consisting of the Group 14 elements exclusive of C and the Group 13 elements exclusive of Tl by heating.

14. A method of producing a negative electrode active substance as set forth in claim 13, wherein said alloy powder is prepared by a gas atomizing method.

15. A method of producing a negative electrode active material which comprises subjecting a raw material comprising a powder containing at least one element selected from the group consisting of the Group 14 elements exclusive of C and the Group 13 elements exclusive of Tl to a mechanical alloying treatment at a reaction temperature of below 90° C.

16. A method of producing a negative electrode active material as set forth in claim 15, wherein said raw material further comprises a powder containing at least one element selected from the transition elements belonging to the fourth period.

17. A method of producing a negative electrode active material as set forth in claim 15, wherein the reaction temperature during said mechanical alloying treatment is below 85° C.

18. A nonaqueous electrolyte cell comprising a negative electrode comprising a negative electrode active material, a positive electrode, and a nonaqueous electrolyte, wherein said negative electrode active material is prepared by subjecting to a mechanical milling treatment an alloy powder containing at least one element selected from the group consisting of the Group 14 elements exclusive of C and the Group 13 elements exclusive of Tl.

19. A nonaqueous electrolyte cell as set forth in claim 18, wherein said alloy powder further comprises at least one element selected from the transition elements belonging to the fourth period.

20. A nonaqueous electrolyte cell as set forth in claim 18, wherein said alloy powder is prepared by melting and liquefying at least one element selected from the group consisting of the Group 14 elements exclusive of C and the Group 13 elements exclusive of Tl by heating.

21. A nonaqueous electrolyte cell as set forth in claim 20, wherein said alloy powder is prepared by a gas atomizing method.

22. A nonaqueous electrolyte cell as set forth in claim 18, wherein said positive electrode comprises a lithium compound as a positive electrode active material.

23. A nonaqueous electrolyte cell as set forth in claim 18, which is a secondary cell.

24. A nonaqueous electrolyte cell comprising a negative electrode comprising a negative electrode active material, a positive electrode, and a nonaqueous electrolyte, wherein said negative electrode active material is prepared by subjecting a raw material comprising a powder containing at least one element selected from the group consisting of the Group 14 elements exclusive of C and the Group 13 elements exclusive of Tl to a mechanical alloying treatment at a reaction temperature of below 90° C.

25. A nonaqueous electrolyte cell as set forth in claim 24, wherein said raw material further comprises a powder containing at least one element selected from the transition elements belonging to the fourth period.

26. A nonaqueous electrolyte cell as set forth in claim 24, wherein said negative electrode active material has an oxygen concentration of not more than 1% by weight.

27. A nonaqueous electrolyte cell as set forth in claim 24, wherein the reaction temperature during said mechanical alloying treatment is below 85° C.

28. A nonaqueous electrolyte cell as set forth in claim 24, wherein said positive electrode comprises a lithium compound as a positive electrode active material.

29. A nonaqueous electrolyte cell as set forth in claim 24, which is a secondary cell.

* * * * *